(12) United States Patent
Daehn et al.

(10) Patent No.: US 8,084,710 B2
(45) Date of Patent: Dec. 27, 2011

(54) LOW-TEMPERATURE LASER SPOT IMPACT WELDING DRIVEN WITHOUT CONTACT

(75) Inventors: Glenn S. Daehn, Columbus, OH (US); John C. Lippold, Hilliard, OH (US)

(73) Assignee: The Ohio State University, Columbus, OH (US)

( * ) Notice: Subject to any disclaimer, the term of this patent is extended or adjusted under 35 U.S.C. 154(b) by 0 days.

(21) Appl. No.: 12/921,249

(22) PCT Filed: Mar. 9, 2009

(86) PCT No.: PCT/US2009/036499
§ 371 (c)(1),
(2), (4) Date: Sep. 7, 2010

(87) PCT Pub. No.: WO2009/111774
PCT Pub. Date: Sep. 11, 2009

(65) Prior Publication Data
US 2011/0000953 A1    Jan. 6, 2011

Related U.S. Application Data

(60) Provisional application No. 61/034,574, filed on Mar. 7, 2008.

(51) Int. Cl.
*B23K 26/00* (2006.01)
*B23K 20/12* (2006.01)

(52) U.S. Cl. ............... 219/121.64; 219/121.85; 228/115

(58) Field of Classification Search ............. 219/121.63, 219/121.64, 121.85
See application file for complete search history.

(56) References Cited

U.S. PATENT DOCUMENTS

| | | | | |
|---|---|---|---|---|
| RE26,858 E | * | 4/1970 | Chudzik | 228/108 |
| 3,520,049 A | * | 7/1970 | Dudin et al. | 219/617 |
| 3,727,296 A | * | 4/1973 | Cranston | 228/108 |
| 3,952,180 A | * | 4/1976 | Gnanamuthu | 219/121.65 |
| 4,535,219 A | * | 8/1985 | Sliwa, Jr. | 219/121.63 |
| 4,684,781 A | * | 8/1987 | Frish et al. | 219/121.78 |
| 4,752,455 A | * | 6/1988 | Mayer | 427/597 |
| 4,987,006 A | * | 1/1991 | Williams et al. | 427/597 |
| 5,155,325 A | * | 10/1992 | McCleaf et al. | 219/121.64 |
| 5,860,306 A | | 1/1999 | Daehn et al. | |
| 5,897,794 A | * | 4/1999 | Hubbard et al. | 219/121.12 |
| 6,047,582 A | | 4/2000 | Daehn et al. | |
| 6,050,120 A | | 4/2000 | Daehn et al. | |
| 6,050,121 A | | 4/2000 | Daehn et al. | |
| 6,085,562 A | | 7/2000 | Daehn et al. | |
| 6,128,935 A | | 10/2000 | Daehn et al. | |
| 6,227,023 B1 | | 5/2001 | Daehn et al. | |

(Continued)

*Primary Examiner* — Kiley Stoner
*Assistant Examiner* — Carlos Gamino
(74) *Attorney, Agent, or Firm* — Standley Law Group LLP

(57) ABSTRACT

A laser, aimed at a flyer plate tab, causes optical energy to be directed at the tab, specifically, at a top surface thereof. Energy impacting the tab accelerates the tab out of an initial bent position, straightening it into an impact with a target sheet. The impact occurs in excess of 100 m/s, resulting in a metallurgical bond between the tab and the target sheet. The laser preferably strikes the top surface in a normal direction, based upon an initial angularity of the tab relative to the target. The laser emission, preferably in the range of 1 to 100 Joules delivered in a microsecond, may be augmented by an ablative layer on the top surface or a transparent covering on the top surface that reacts against the expanding gas from ablative activity on the top surface. The weld is formed without physical contact between the welding device and the tab.

5 Claims, 2 Drawing Sheets

U.S. PATENT DOCUMENTS

| | | |
|---|---|---|
| 6,410,884 B1 | 6/2002 | Hackel et al. |
| 6,807,717 B2 | 10/2004 | Daehn |
| 7,000,300 B2 | 2/2006 | Daehn |
| 7,069,756 B2 | 7/2006 | Daehn |
| 7,076,981 B2 | 7/2006 | Bradley et al. |
| 7,425,229 B2 | 9/2008 | Frankel et al. |
| 7,473,028 B1 | 1/2009 | Alexandrov et al. |
| 7,696,453 B2 | 4/2010 | Frankel et al. |
| 7,743,967 B2 | 6/2010 | Frankel et al. |
| 2002/0056707 A1 | 5/2002 | Pinho et al. |
| 2006/0254039 A1 | 11/2006 | Daehn |
| 2007/0138157 A1 | 6/2007 | Dane et al. |

\* cited by examiner

LOW-TEMPERATURE LASER SPOT IMPACT WELDING DRIVEN WITHOUT CONTACT

CROSS-REFERENCE TO RELATED APPLICATIONS

This application is a national stage entry of, and claims the benefit of priority under 35 USC 365 to, PCT/US2009/036499, filed 9 Mar. 2009, which is in turn a non-provisional of, and claims the benefit of priority under 35 USC 119 to, U.S. provisional application 61/034,574, filed on 7 Mar. 2008. Both applications are incorporated by reference as if fully recited herein.

TECHNICAL FIELD

The present invention is in the field of collision joining. Specifically, the present invention relates to the use of a laser or some other energy source such as focused non-coherent light or by vaporization of a metal foil by an electrical discharge to impart momentum to an article to be collision joined.

BACKGROUND OF THE ART

The joining of similar and dissimilar metals is a technical topic that is of great practical importance and can be quite problematic. This is an issue that is important in a variety of industries such as the automotive, aerospace, medical, microelectronics, and food and beverage industries. Broadly there are two ways that joints can be formed between metals: mechanical interlocks or metallurgical bonds. There are a variety of subcategories of each of these.

Mechanical interlocks can be formed along linear features by variants on folding metal across itself to create folded seams. Examples of this kind of joining can be found in the joints that hold can ends on can bodies and automobile closure panels such as doors where an outer panel is interlocked with an inner panel with a fold known as a hem. Mechanical interlocks can also be used at a discrete location. This kind of feature is known as a clinch or clinch-lock and is produced by deforming two sheets of metal into two interlocking cup-like or reentrant features. This type of interlock is almost universally used to hold the tab onto the end of a beverage can.

Joining between metal components is often accomplished by welding, where the defining characteristic is that the two metal surfaces become adhered to one another. This is typically done where both metals are melted (by heat provided in one of numerous ways) until the two metals become mixed (sometimes with a filler metal added) and upon solidification a joint is formed. Fusion welding has two very significant drawbacks. First, it is limited to alloys that make compatible pairs when mixed. Many alloy systems will form brittle intermetallics when mixed and this provides poor mechanical performance. Second, the heat that is deposited in the weld zone usually dramatically softens the material adjacent to the weld and the melted and solidified material itself may be quite weak or brittle. As a result, the metals that make up welded structures typically have quite low strength in the region that makes up the weld. Other related alternatives to fusion welding also exist. Solid state welding can be accomplished by variants of resistance or of spot welding, high velocity collision welding (as is usually accomplished using explosives) and ultrasonic welding. Also, interlayers can be used in methods such as brazing and soldering. These techniques can all have significant disadvantages for when considering specific applications.

It is well known that if two relatively clean metal surfaces collide with an appropriate velocity (usually over 200 m/s and typically in the range of from about 150 to 500 m/s) and the impact angle is within a proper range (usually about 15 degrees and typically in the range of from about 5 to about 25 degrees) the two surfaces may adhere forming a metallurgical joint. This technology is well developed and fairly well understood and practiced in explosive welding and electromagnetic welding. In both these cases a sheet known as a flyer plate is usually driven at high speed either by the explosive or electromagnetic force and strikes a sheet that is often thicker referred to as a target. Upon striking there is little overall increase in temperature and the material is often hardened by the local plastic strain of impact. Similar or dissimilar metals can be joined in this manner as there is not sufficient time or temperature for the formation of brittle intermetallics. Metallurgical joints formed in this manner can have the strength of the parent material.

However, explosion welding has some disadvantages, not the least of which are the safety and containment issues associated with the process. Additionally, it is very difficult to couple explosives or magnetic pulse energy to small structures (on the order of millimeters or smaller). However, collision processes also have some tremendous advantages; most notably the fact that virtually any metal combination can be joined using this process. Because the heat required for joining is localized at the interface and quickly dissipated by the materials that are being joined, explosion welds typically do not form large or interconnected regions of embrittling intermetallic compounds (even in complex systems) and the residual stresses generated are essentially nil. For these reasons, the potential for joining materials using high velocity collisions that do not require the use of explosives offers the potential for joining otherwise difficult (or impossible) to join materials. These include many of the advanced structural materials based on intermetallic compounds, composites, nano-structured materials and metallic glasses.

SUMMARY

The present invention uses intense laser discharges or some other energy source to provide a mechanical impulse to a metal surface by one of a variety of mechanisms. Direct reflection of photons provides some level of force and impulse. Also, the surface of the metal may ablate under the beam and this generated gas can also produce a pressure that accelerates the flyer. The metal surface may also be coated with a polymer or other material that better absorbs optical energy and/or is more easily ablated. This can generate the same impulse at reduced laser energy. One additional way to increase the efficiency of converting the optical energy to mechanical impulse is by placing an optically-transparent material opposed to the ablated surface to provide a surface to oppose the generation of the expanding gas. This will help to accelerate the flyer plate.

One tremendous advantage of this technique over electromagnetic or explosive launching is that the shock can be directed to a precise location (sub-micron precision) and at a precise time (precision of $<10^{-5}$ seconds). The ability to apply enormous pressure at exact and localized points on a material interface and to do so with timing accuracy allows the present invention to create welds in applications involving micro/nano interfaces.

One particularly attractive product that can be made with this technology is the joint between the can tab and can end that is part of almost all conventional aluminum and steel beverage cans. Presently this joint is created as a mechanical interlock. A protrusion is developed on the can end using multiple sequential stamping operations by a technique referred to as progressive stamping. Once this protrusion (that takes on a shape resembling a cylinder with an open bottom) is created, the tab is placed over it such that the protrusion goes through a hole in the tab and then the protrusion is peened down to capture the tab. This requires significant ductility of the material that makes up the can end. This kind of ductility is generally only found in metals of relatively low strength. Because the metal must be relatively weak to maintain acceptable formability, the can-end metal must be relatively thick to accommodate the structural needs of the can. In principle the tab could also be spot welded to the end, however, this would produce a severely weakened zone in the proximity of the weld nugget and again this would necessitate a thicker than optimum weld zone. The present invention overcomes the limitations of prior art joining techniques providing an ideal solution for placing a tab on a can end as both the tab and end can be produced from thin sections of high strength material and the as-produced strength of both materials is maintained through the joining process. Accordingly, the present invention allows for the can end to be fabricated from a thinner piece of higher strength material, thus saving weight and cost in the can and producing associated environmental benefits.

These effects may be realized by a method for producing a spot impact weld between a first part and a second part. The method is conducted by providing the first and second parts, with a portion of the first part bent at an angle out of a generally planar surface of the remainder of the first part. The first and second parts are positioned on a support backing, with the second part between the first part and the support backing. The first part is positioned so that the second part underlies at least the bent portion of the first part with the bent portion bent away from the second part. A laser is aligned to direct its emitted energy at a top surface of the bent portion. At least one pulse of optical energy is directed from the laser onto the top surface, the amount of energy being sufficient to cause the bent portion to straighten and impact the underlying second part with a velocity of at least 100 m/s, resulting in a metallurgical bond between the respective parts.

In some aspects, the laser is aligned relative to the bent portion so that the first of the at least one pulses is substantially normal to the bent portion.

In some aspects, the angle of the bent portion is in the range of from about 10 to about 20 degrees.

In many aspects, the laser deposits in the range of from about 1 to about 100 Joules per microsecond onto the bent portion.

To augment the inventive effect, many embodiments will comprise the step of interposing a layer of an ablative material on the top surface of the bent portion prior to the step of directing the at least one optical energy pulse.

Another augmentation of the effect may occur from covering the top surface, or the ablative material on the top surface, if the ablative material is present, with a layer of material that is transparent to the optical energy, but that augments an effect from gas emanating from the ablation.

Some aspects of the invention are achieved by a system for producing a spot impact weld of a first part to a second part. Such a system comprises a laser; and a means for supporting the first and second part during a spot welding procedure.

In many of these systems, the laser is a pulse laser capable of depositing a directed optical energy beam in a range of about 1 to about 100 Joules in a microsecond onto a portion of the first part.

In some aspects, the laser is adapted to be aimed to direct the optical energy beam therefrom in a line that is substantially normal to a top surface of the bent portion.

Still further aspects of the invention are achieved by a spot welded product produced by the any one of the above methods.

BRIEF DESCRIPTION OF THE DRAWINGS

Better understanding of the invention, and particularly, the disclosed embodiments thereof, will be had when reference is made to the accompanying drawings, wherein identical parts are identified with identical reference numbers and wherein.

DETAILED DESCRIPTION OF THE PREFERRED EMBODIMENT(S)

In accordance with the foregoing summary, the following presents a detailed description of the preferred embodiments of the invention that is currently considered to be the best mode.

Figure 1:
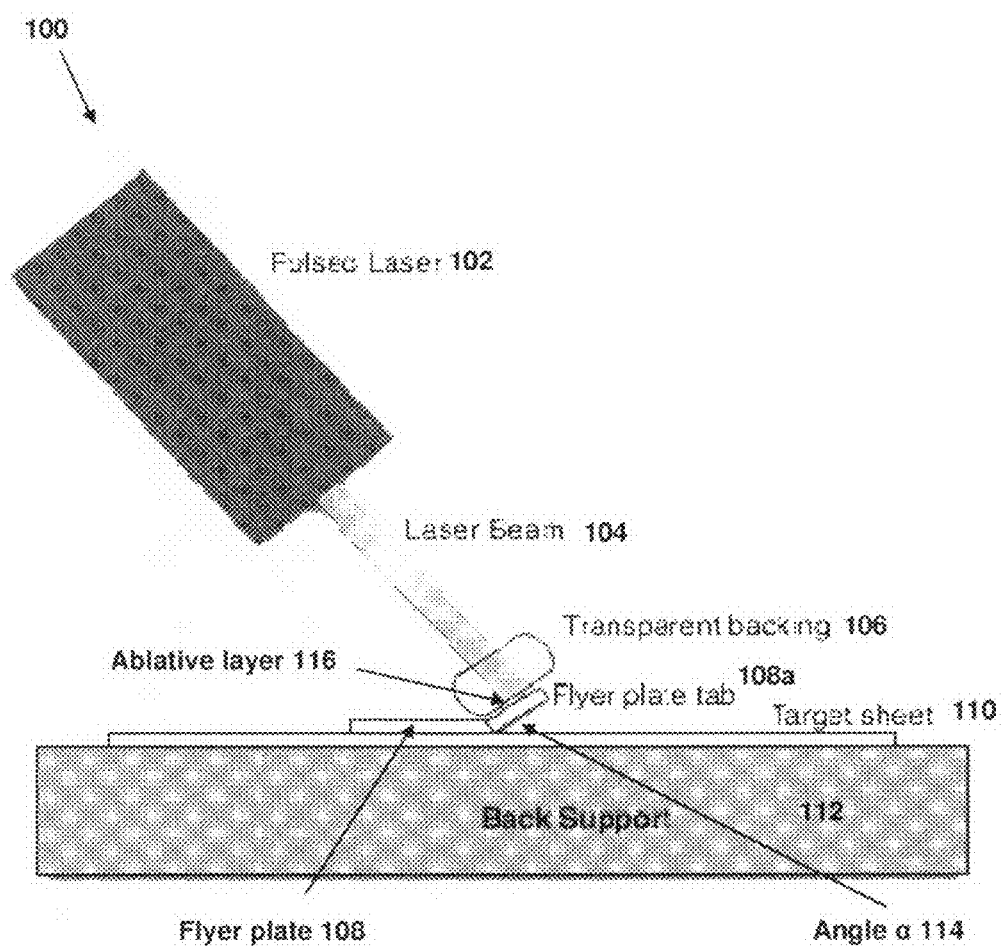
FIG. 1 schematically illustrates a system for practicing one embodiment of the present invention.

FIG. 1 depicts a system 100 for the practice of the present invention in accordance with one embodiment thereof. The system comprises a high powered laser 102 aimed at a flyer plate 108 positioned on the target sheet 110 to which the flyer plate tab 108a will be welded. The target sheet is supported by a mechanically-stiff back support 112. The angle α 114 between the flyer plate tab 108a and target sheet 110 is about 15 degrees, but may fall in the range of from about 5 degrees to about 20 degrees. An offset distance without an angle can also permit the two surfaces to impact at an appropriate angle for impact welding.

The high power pulsed laser 102 is capable of depositing from 0.1 to 100 Joules of optical energy focused in a local area on the top surface of flyer plate tab 108a in approximately 1 microsecond or less. The energy focused on the flyer plate tab 108a is accelerated by the interaction of the incident laser beam 104 and top surface of the flyer plate, causing the flyer plate tab 108a to impact target sheet 110 at a velocity in excess of 100 m/s to thereby develop a metallurgical bond upon impact. The metallurgical bond may have a surface area of from less than about 1 mm$^2$ to about 100 mm$^2$.

The system may be augmented by placing an absorptive and/or ablative layer 116 on the top surface of the flyer plate tab 108a and/or by placing a transparent backing 106 so as to allow it to react against the expanding gas caused by ablation emanating from the top surface of the flyer plate tab 108a.

The ablative layer 116 may be formed from a variety of materials that efficiently ablate when struck with laser beam 104. For example, the ablative layer may be a carbon deposit or cellophane-type material. The ablative layer may be shaped (i.e., increasing in thickness in one direction, having a pyramidal shape, etc.) or may be provided as a film having a near constant thickness.

The transparent backing 106 may be formed of any material through which the laser beam 104 may pass without significant loss in optical energy in order to provide sufficient velocity so as to weld the flyer plate tab 108 to target sheet 110. Suitable materials include, but are not limited to, sapphire, quartz, glasses, and polymers.

Acceleration may also be done with some other energy source such as focused non-coherent light or by vaporization of a metal foil by an electrical discharge. In either of these cases, a metallurgical bond is created through a collision that is effected without a physical contact between the device causing the impact and the workpiece being accelerated.

Also, it is noted that while the specific embodiment taught herein shows a flyer plate tab which is bent away from an otherwise planar member as the surface that is being accelerated into a bond-forming collision with another member, it will be clear to one of skill in this art that the requisite features for practice of the concept described herein are an energy source that can generate the requisite amount of acceleration by impacting the surface and a gap between the members being joined. As to the gap, it is noted that the gap should be sufficiently large to allow the acceleration to occur, but, at the same instant, be sufficiently small to efficiently limit the power needed to effect the acceleration.

Figure 2:
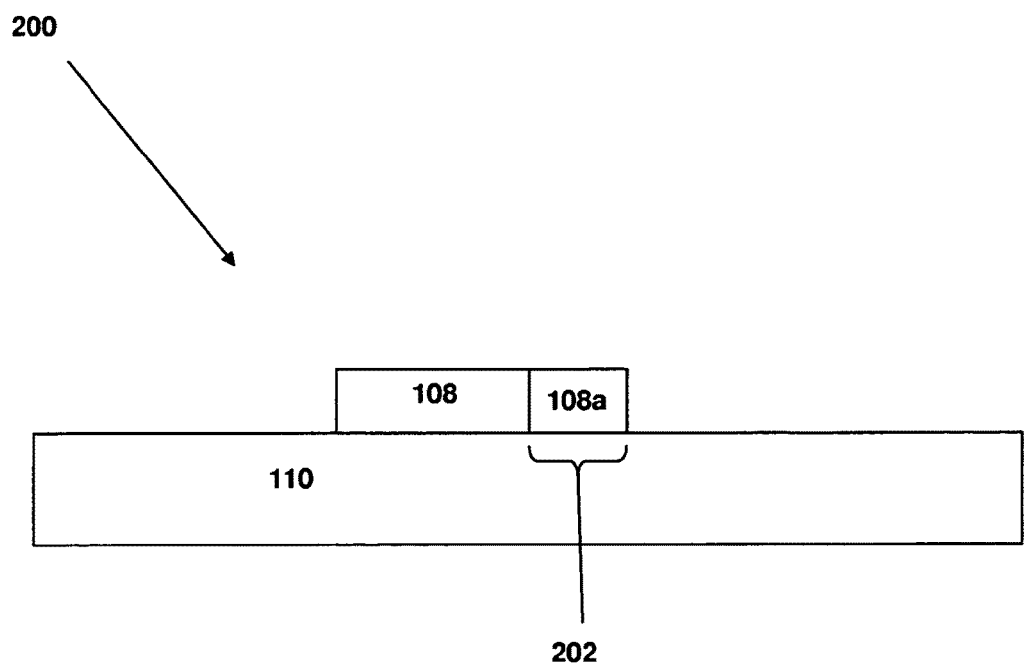
FIG. 2 schematically illustrates an article by the system of FIG. 1.

FIG. 2 presents the article 200 produced by welding the flyer plate tab 108*a* of flyer plate 108 to the target sheet 110. A metallurgical bond 202 exists between the flyer plate tab 108*a* and target sheet 100.

What is claimed is:

1. A method for producing a spot impact weld between a first part and a second part, comprising the steps of:

providing the first part, which comprises two portions as a result of a bend in the first part that imposes an obtuse internal angle between the first portion and the second portion;

positioning the first part on a surface of the second part, such that the first portion of the first part lies atop the surface and the bend in the first part causes the second portion to extend away from an underlying portion of the second part at an acute angle;

aligning a laser to direct the energy emitted therefrom at the second portion of the first part; and accelerating the second portion across the gap into collision with the underlying portion of the second part, removing the bend from the first part and forming a metallurgical bond between the first and second parts, the acceleration effected by directing at least one pulse of energy from the laser without use of explosives or an ablative layer.

2. The method of claim 1, wherein:

the accelerating step results in the metallurgical bond without contact from the laser.

3. The method of claim 1, wherein:

the laser is aligned relative to the second portion so that the first of the at least one pulses is substantially normal to the second portion.

4. The method of claim 3, wherein:

the angle of the second portion is in the range of from about 160 to about 170 degrees.

5. The method of claim 4, wherein:

the laser deposits in the range of from about 1 to about 100 Joules per microsecond onto the second portion.

* * * * *